(12) United States Patent
Atwater et al.

(10) Patent No.: US 7,549,519 B2
(45) Date of Patent: Jun. 23, 2009

(54) FREE SPACE DAMPER

(75) Inventors: D. Stuart Atwater, Grand Rapids, MI (US); Sean E. Couch, Allegan, MI (US)

(73) Assignee: Suspa Incorporated, Grand Rapids, MI (US)

( * ) Notice: Subject to any disclaimer, the term of this patent is extended or adjusted under 35 U.S.C. 154(b) by 0 days.

(21) Appl. No.: 12/107,307

(22) Filed: Apr. 22, 2008

(65) Prior Publication Data

US 2008/0264744 A1 Oct. 30, 2008

Related U.S. Application Data

(60) Provisional application No. 60/914,775, filed on Apr. 30, 2007.

(51) Int. Cl.
*F16F 11/00* (2006.01)
(52) U.S. Cl. .................... 188/381; 188/322.22; 267/205
(58) Field of Classification Search ................ 188/129, 188/322.15, 381, 322.22; 267/134, 196, 267/201, 205, 207, 210
See application file for complete search history.

(56) References Cited

U.S. PATENT DOCUMENTS

| | | | | |
|---|---|---|---|---|
| 4,955,467 A | | 9/1990 | Kallenbach | |
| 5,295,564 A | * | 3/1994 | Stadelmann | 188/381 |
| 5,549,182 A | * | 8/1996 | Ehrnsberger et al. | 188/129 |
| 6,053,291 A | * | 4/2000 | Shibahata et al. | 188/271 |
| 6,574,997 B1 | | 6/2003 | Mayer et al. | |
| 7,428,954 B2 | * | 9/2008 | Park et al. | 188/322.18 |
| 2003/0183994 A1 | | 10/2003 | Atwater | |
| 2004/0173421 A1 | * | 9/2004 | Park et al. | 188/267 |
| 2005/0183912 A1 | | 8/2005 | Peuker et al. | |
| 2005/0224303 A1 | * | 10/2005 | Park et al. | 188/322.15 |
| 2006/0054440 A1 | | 3/2006 | Peuker et al. | |
| 2007/0017260 A1 | * | 1/2007 | Dillmann et al. | 68/23.1 |
| 2007/0039792 A1 | | 2/2007 | Peuker et al. | |

\* cited by examiner

*Primary Examiner*—Christopher P Schwartz
(74) *Attorney, Agent, or Firm*—Price, Heneveld, Cooper, DeWitt & Litton, LLP

(57) ABSTRACT

A spool-shaped damper piston which is slideably mounted on a damper rod and has an external foam friction element engaging the inner surface of the cylindrical damper body. A pair of axially movable limiting disks are spaced from the spool-shaped damper a predetermined distance to allow movement of the damper rod a predetermined amount before the spool-shaped damper is engaged. In one embodiment, the disks include axially extending tabs which extend through slots in the ends of the spool and selectively engage the foam friction element when the motion of the damping rod exceeds a predetermined threshold. In another embodiment of the invention, the limiting disks include spring fingers extending between the disks and the spool ends to cushion the initial engagement between the disks and the spool as the free space threshold is exceeded.

20 Claims, 4 Drawing Sheets

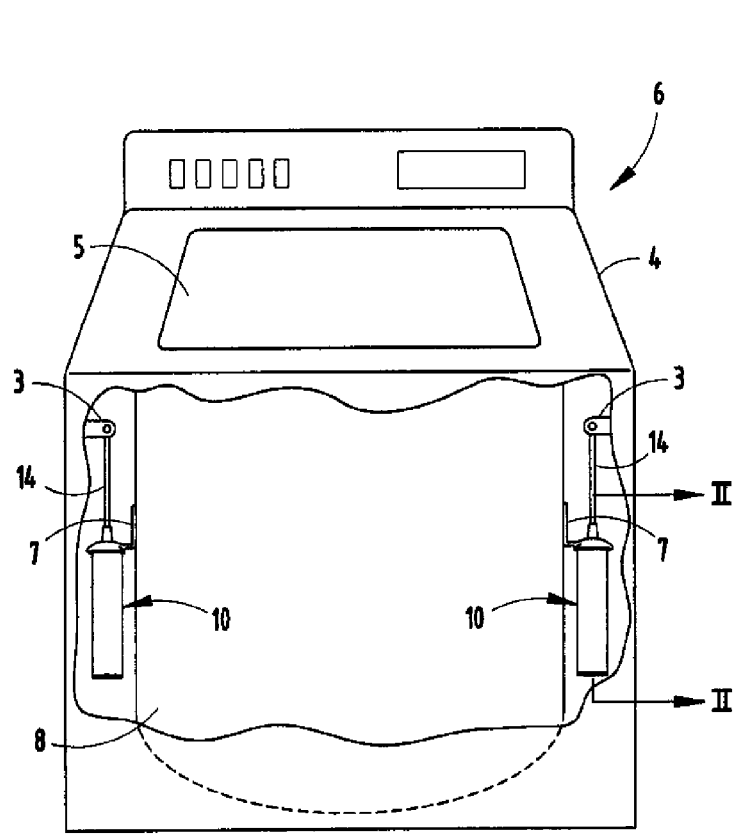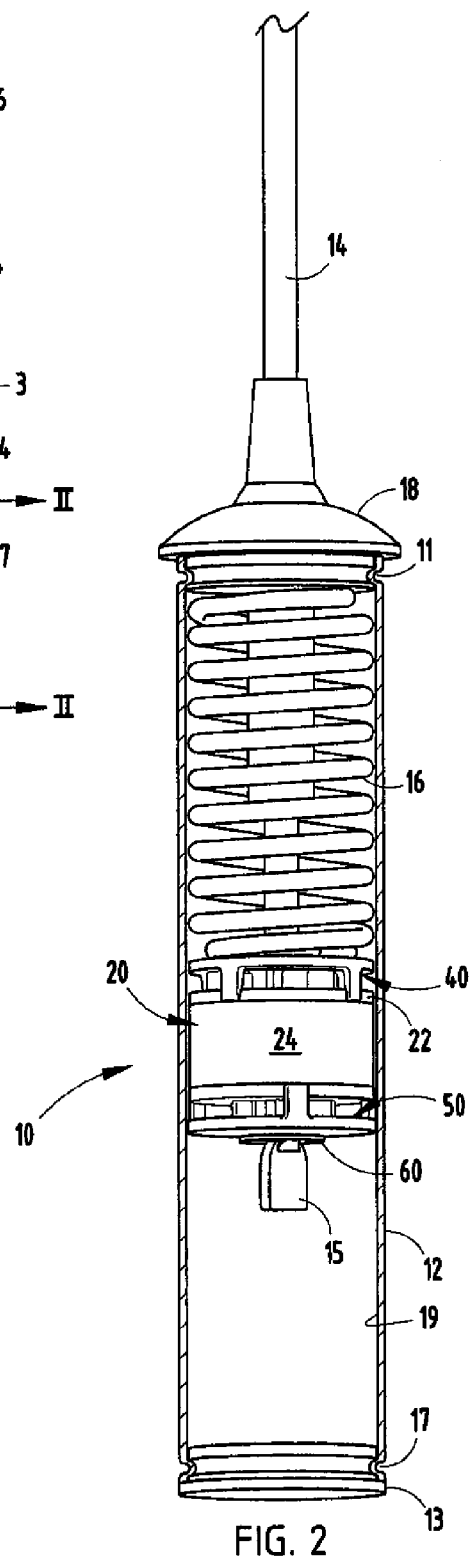
FIG. 1
FIG. 2

FREE SPACE DAMPER

CROSS-REFERENCE TO RELATED APPLICATIONS

This application claims priority under 35 U.S.C. § 119(e) on U.S. Provisional Application No. 60/914,775 entitled FREE SPACE DAMPER, filed on Apr. 30, 2007, by D. Stuart Atwater et al., the entire disclosure of which is incorporated herein by reference.

BACKGROUND OF THE INVENTION

The present invention relates to a damper which allows a predetermined degree of movement before damping action is instituted.

Dampers are employed in a variety of applications for preventing excessive, uncontrolled movement. In one application, for example, in horizontal or vertical axis washing machines, designed dampers are employed to prevent the washer basket from over-vibration during a spin cycle. U.S. Publication No. 2003/0183994 entitled DAMPER SPRING STRUT, published Oct. 2, 2003, discloses the environment of such an application for a damper.

Each time a conventional damper is employed, for example, in a washing machine, and subjected to loads during an unbalanced spin cycle, the damping action reduces the energy available for the spinning action and, therefore, robs energy from the overall system operation. Damping action also transmits forces to the floor, which can result in unwanted noise and household vibration. In order to allow a certain amount of unobjectionable vibration during such a spin cycle, a damper has been proposed as disclosed in U.S. Publication No. 2006/0054440 entitled DAMPER, published Mar. 16, 2006, the disclosure of which is incorporated herein by reference. This damper, although providing some free motion before damping action occurs and, therefore, is energy saving, is relatively large, and requires a considerable amount of space in the damping device itself for its effective operation.

There remains a need, therefore, for a compact free space damper which allows a minimum amount of motion without providing damping action but, once that threshold has been exceeded, provides the desired damping for the application in which the damper is employed. Additionally, there remains a need for a damper which is gradually engaged through cushioning structure to smooth the transition between undamped and damped operation.

SUMMARY OF THE INVENTION

The system of the present invention satisfies this need by providing a spool-shaped damper which is slideably mounted on a damper rod and has an external foam friction element engaging the inner surface of the cylindrical damper body. The spool-shaped damper receives axially movable disks which are spaced from the spool-shaped damper a predetermined distance to allow movement of the damper rod a predetermined amount before the spool-shaped damper is engaged. In one embodiment, the disks include axially extending fingers which extend through the ends of the spool and selectively engage the foam friction element when the motion of the damping rod exceeds a predetermined threshold. In the preferred embodiment, the spool receives axially movable disks at opposite sides with fingers which are alternately staggered to engage the foam member in radially spaced relationship. In one embodiment of the invention, the axially movable disks include spring fingers extending between the disks and the spool ends to further cushion the initial engagement between the disks and the spool as the free space threshold is exceeded.

With such a system, a compact, relatively inexpensive free space damper is provided which can be configured to provide a selected amount of free space movement before damping occurs and further provide cushioning initiation of the damping by either employing fingers which engage the friction damping foam and/or resilient springs extending between the damper spool and movable disks.

These and other features, objects and advantages of the present invention will become apparent upon reading the following description thereof together with reference to the accompanying drawings.

BRIEF DESCRIPTION OF THE DRAWINGS

FIG. 1 is a perspective pictorial view of a washing machine, shown partly broken away to illustrate the mounting of two of the dampers embodying the present invention;

FIG. 2 is a side elevational view, partly in cross section, of a damper embodying the present invention;

DETAILED DESCRIPTION OF THE PREFERRED EMBODIMENT

Figure 3:
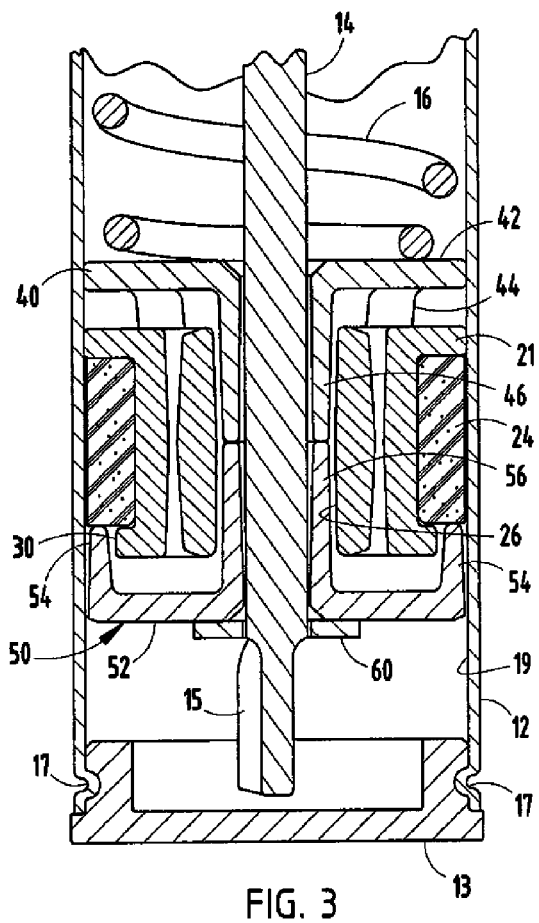
FIG. 3 is a greatly enlarged, cross-sectional view of the damper mechanism shown in FIG. 2.
Figure 5:
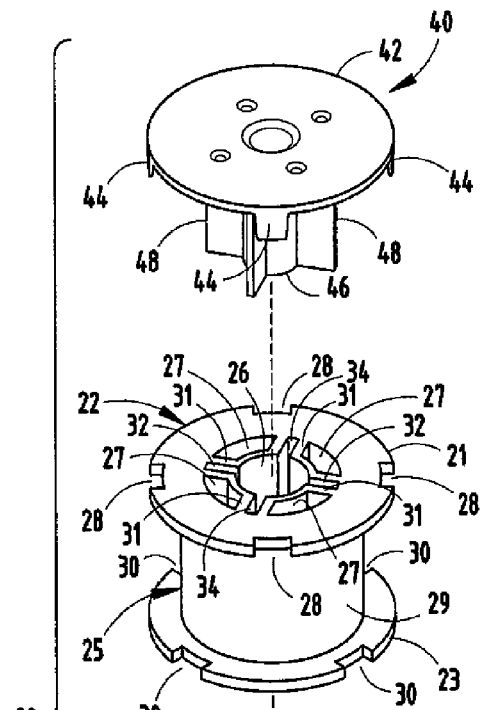
FIG. 5 is an exploded perspective view of the damper spool assembly shown in FIG. 4.
Figure 5:
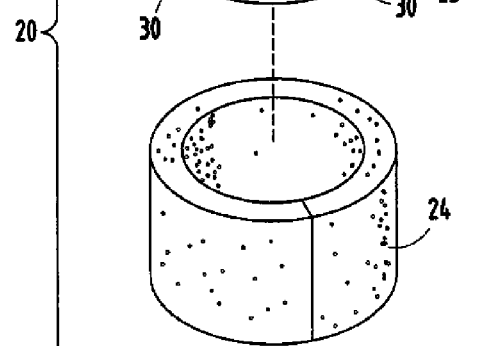

Referring initially to FIG. 1, there is shown a washing machine 6, which includes a cabinet and frame 4 and a drum 8 for receiving clothes to be laundered through a hinged cover 5. Drum 8 rotates and agitates the clothes during wash and spin dry cycles and is subject to vibrations during normal operation of the machine and when there are unbalanced loads. Drum 8 is supported by a plurality of dampers 10 (two shown in the pictorial diagram of FIG. 1) at various locations. The dampers are mounted in a tension mode with a bracket 7 secured to the drum 8 and engaging the an end cap 18 (FIG. 2) of damper 10 which includes a rod 14 extending therefrom which is secured to the frame 4 of the machine by a fixed bracket 3. Typically, four such dampers are employed for suspending the drum 8 within cabinet 4 and provides the desired improved damping function of this invention. Damper 10 is described in detail in connection with FIGS. 2-7.

Each of the dampers 10 used in the environment of FIG. 1 and embodying this invention include a cylindrical housing 12 and a central rod 14 extending therefrom (FIGS. 1 and 2). A compression spring 16 extends between the hemispherical upper end cap 18 of housing 12 and a damper spool assembly 20. Cap 18 is secured to cylindrical housing 12 by a roll-formed bead 11. The damper spool assembly 20 includes a spool-shaped shuttle piston 22 (FIGS. 3-7) which holds the damping foam 24 around its cylindrical core 25 between an upper disk-shaped end 21 and a lower disk-shaped end 23 integrally molded with the cylindrical core 25 of piston 22.

Piston 22 includes a central axially extending aperture 26 for slideably receiving rod 14. Core 25 is comprised of spaced-apart concentric inner and outer cylinders 27, 29 (FIG. 5) coupled by radial ribs 31 defining the slots 32, 34. Slots 32 and 34, extending in communication with aperture 26, extend longitudinally through piston 22. Each end 21 and 23 of piston 22 include, in the embodiment shown, four equally spaced radially extending slots 28 in end 21 and slots 30 in end 23. Slots 28 and 30 are offset 45° from one another.

Figure 4:
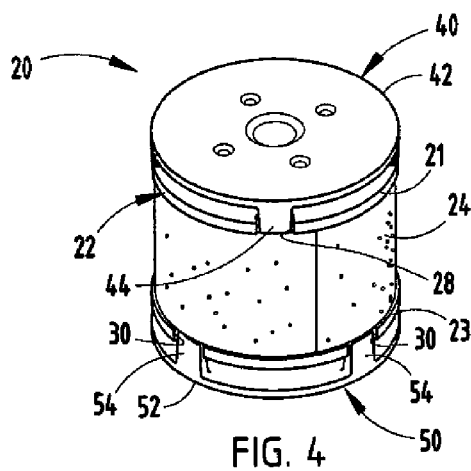
FIG. 4 is a perspective view of the damper spool assembly shown in FIGS. 1 and 2, shown from a first viewing angle.
Figure 6:
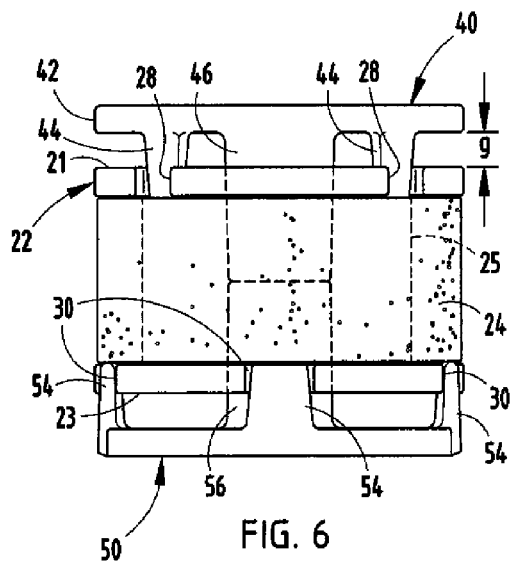
FIG. 6 is a side elevational view of the damper spool assembly shown in FIG. 4.
Figure 7:
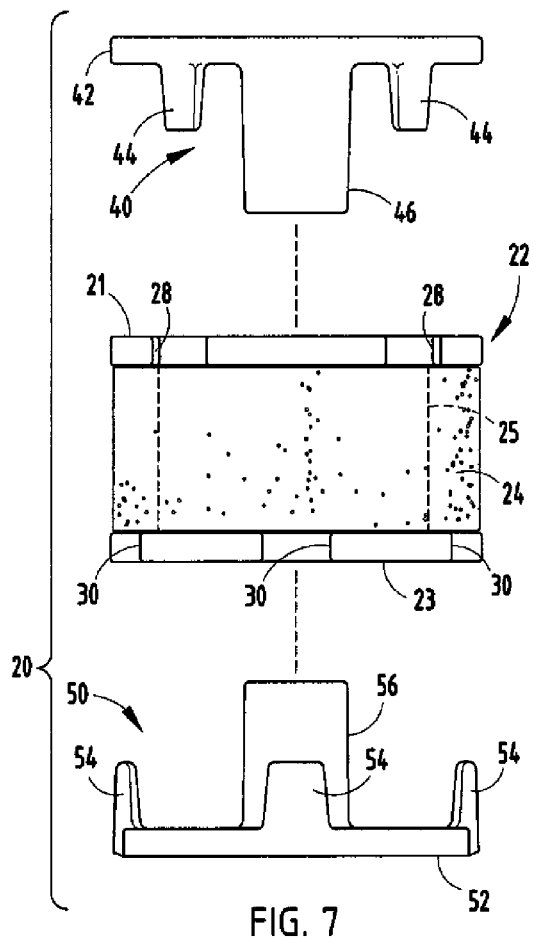
FIG. 7 is an exploded side elevational view of the damper spool assembly shown in FIG. 4.

The spool assembly further includes an upper stroke limiter 40 and a lower stroke limiter 50 which slideably engage piston 22 in an angularly indexed manner. Limiters 40 and 50 each include a disk shaped end 42, 52 and four equally spaced axially extending tabs at the outer edges which extend toward piston 22. The limiters 40, 50 also include a cylindrical axle 46, 56 which has a diameter to fit within aperture 26 of piston 22. Extending radially outwardly from axels 46, 56 are four equally spaced longitudinally extending flanges 48, 58 having a length which extends about half of the height of piston 22. Flanges 48, 58 fit within slots 32 and 34 of piston 22 to index the tabs 44 to fit within slots 28 and tabs 54 to fit within slots 30 of piston 22 as best seen in FIGS. 4 and 6. The spool assembly 20 of the damper 10, including the piston 22, damping foam 24, and stroke limiters 40, 50, is assembled, as seen in FIGS. 4 and 6, and is mounted in cylinder 12, as seen in FIGS. 2 and 3. The lower stroke limiter 50 is held against a washer 60 by the force of the compression spring 16 which engages the upper limiter 40. Washer 60 is locked to rod 14 by a flattened end 15 on rod 14 above a lower end cap 13 secured to housing 12 by a roll formed bead 17. When the damper is installed in clothes washer 6, the weight of the drum or tub 8 compresses spring 16, as seen in FIG. 2, to position the spool assembly 20 near the midpoint of cylinder 12.

During operation of the washer, piston 22 can float between the opposed stroke limiters 40, 50 an amount indicated by the gap "g" shown in FIG. 6. The tabs 44 and 54 engage the upper and lower annular edges of the foam damping medium 24 during such limited motion to provide a transitional damping along the distance "g". Once this "free space" has been exceeded by the vibrational movement of the drum 8 and thus the rods 14, the upper or lower stroke limiter disks 42, 52 engage the ends 21 or 23 of piston 22 causing the spool assembly 20 to move within cylinder 12 with the friction pad 24 engaging the inner wall 19 of the cylinder to provide a significant damping force to resist over vibration of the drum 8. The stroke limiters allow some relatively free movement initially of the rod 14 before full damping action is instituted. Thus, rod 14 can move a limited distance with little or no friction and then the friction damping piston 22 is engaged for the remainder of the stroke. This allows, for example, a washing machine drum to reduce damping action during small-stroke events to save energy but provide full damping when desired.

The staggered angular location of the tabs 44, 54 in relation to the main cross section allows the same stroke limiter detail to be used in the top and bottom of the shuttle piston 22 and keeps the top and bottom tabs from directly opposing each other across the foam 24. This increases the durability of the foam and eliminates an extra component, reducing costs and error-proofing the assembly.

Although FIG. 1 illustrates one application of a damper of the present invention, one or more of the dampers 10 can be mounted in a variety of manners between a fixed and a movable element, the motion of which is to be damped as, for example, shown in U.S. Patent Publication No. 2003/0183994, the disclosure of which is incorporated herein by reference.

Figure 18:
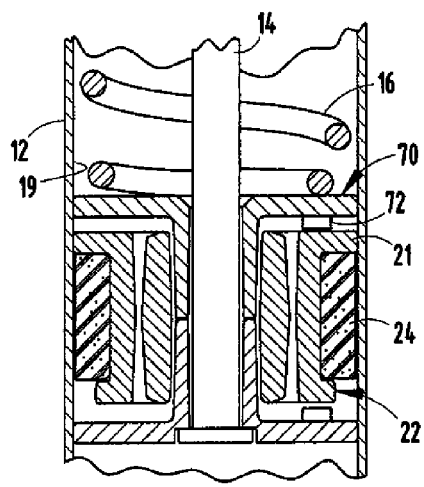
FIG. 18 is an enlarged fragmentary cross-sectional view of a damper spool assembly of the present invention employing damper stroke limiting disks utilizing springs of the type shown in FIGS. 8-17.
Figure 8:
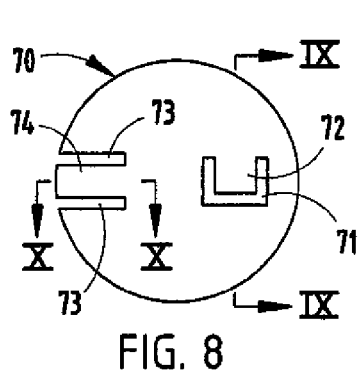
FIG. 8 is a plan view of an alternative embodiment of a stroke limiting disk employed in the damper spool assembly.
Figure 9:
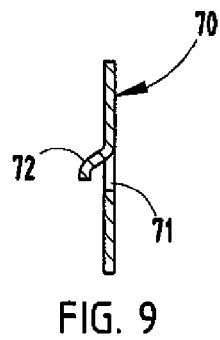
FIG. 9 is a cross-sectional view of the spring finger shown in FIG. 8, taken along section lines IX-IX of FIG. 8.
Figure 10:
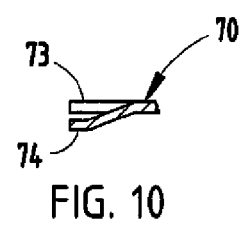
FIG. 10 is a cross-sectional view of the spring finger shown in FIG. 8, taken along section lines X-X.
Figure 11:
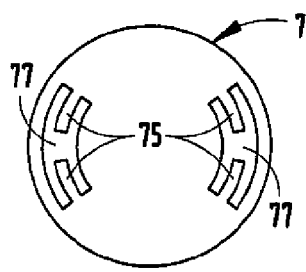
FIGS. 11-17 are plan views of alternative embodiments of spring fingers formed in stroke limiting disks employed with the damper of the present invention.
Figure 12:
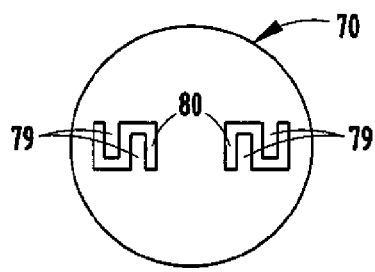
Figure 13:
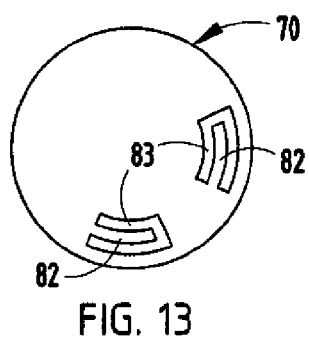

Instead of the motion limiting disks including axially extending tabs, such as tabs 44 and 54, which engage the annular edges of the foam damping medium 24 for the initial "free space" transitional damping, the disks 40 and 50 may instead include integrated spring fingers, such as shown in FIGS. 8-17, which are operational as illustrated in FIG. 18. The spring fingers may take on a variety of configurations and, for purposes of discussion, the plan views of the disks are shown in FIGS. 8-17, with FIG. 8 showing a motion limiting disk 70 which is understood to have the same axially extending cylinder, such as cylindrical axles 46 and 56 shown in FIG. 5 of the prior motion limiting disks, as well as the outwardly extending, interlocking flanges 48 and 58 of the prior embodiments. The disks, however, have integrated spring fingers, such as 72 and 74 illustrated in the FIG. 8 embodiment, which extend from the plane of disk 70 toward spool ends 21 and 23. Spring finger 72, shown in FIGS. 8 and 9, is formed by a U-shaped slot 71. Spring finger 74, shown in detail in FIG. 10, is formed instead by a pair of radially inwardly extending slots 73 to form the spring finger 74. Similarly, other spring fingers, such as fingers 75 in the embodiment shown in FIG. 11 can be formed by arcuate, somewhat H-shaped slots 77 formed through the disk 70 while spring arms 79 can be formed by somewhat S-shaped slots 80, as seen in FIG. 12. FIG. 13 shows an alternative embodiment in which arcuate spring arms 82 are formed by arcuate U-shaped slots 83. Additional spring arms 82 may extend around the periphery of the limiting disk 70.

Figure 14:
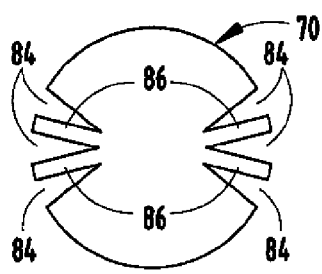
Figure 15:
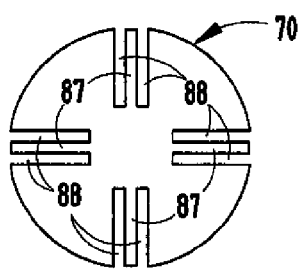

FIG. 14 shows an alternative embodiment of the motion limiter 70 in which wedge-shaped slots 84 are formed radially inwardly and free spring arms 86 and are deflected downwardly, as are the remaining spring arms in the earlier discussed embodiments, to provide contact with the piston 22. FIG. 18 illustrates the engagement of spring arms 72 with the upper surface of disk 21 of piston 22. Similarly, in FIG. 15, spring arms 87 are formed by radially inwardly extending slots 88 at equally spaced locations, and arms 87 are deflected downwardly toward piston 22 in the case of the upper limiter and upwardly toward the piston in the case of the lower limiter.

Figure 16:
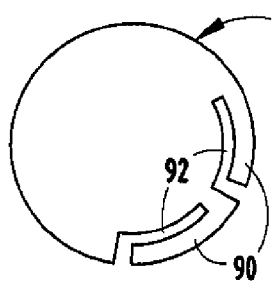
Figure 17:
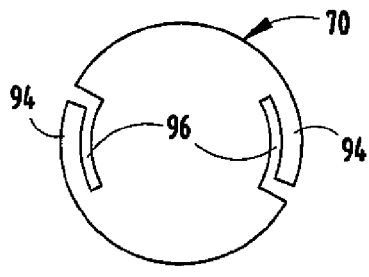

FIG. 16 shows another embodiment in which arcuate spring arms 90 are formed with inwardly, arcuately extending slots 92. Arms 90 may be formed around the entire periphery of the motion limiter 70 shown in FIG. 16. Opposed arcuate spring arms 94, as shown by the embodiment of FIG. 17, can also be formed by arcuate shaped slots 96. The radially extending spring arms 94, which are formed to be bent toward the piston 22 for the upper and lower motion limiting disks. The various arm configurations shown in FIGS. 8-17 can be combined in any desired combination to provide a desired initial transition cushion between the free space motion of the rod 14 and spool assembly 20 before the full damping is achieved with the motion of piston 22 within the inner surface 19 of cylinder 12 with friction pad 24 engaging surface 19 for full damping action Spool 22 and limiters 26, 28, and 70 are integrally molded of a suitable polymeric material, such as polyethylene. The foam material 24, which is captively held within the recess of spool 22, is a commercially available closed-cell foam polymeric material, such as polyurethane. The interior wall 19 of the cylinder 12 is lubricated with a commercially available highly temperature-stable lubricant to provide the desired damping action once the free space provided by the damper assembly 20 has been exceeded. The same elements can be used to make a free space version of a "rod" tension damper 10 (used in top-loading washing machines); a strut compression damper used in front-loading and top-loading washing machines; and a standard damper used in front-loading washing machines.

This free space mechanism allows the use of larger diameter metal cylinders 12 while occupying the same space as existing dampers. The larger diameter cylinders offer more surface area for friction, causing lower heat density in the foam 24 and cylinder 12, and offer a much larger surface area for heat dissipation, which is an important element in determining the durability and control in a washing machine damper.

In all versions of the dampers of the present invention, the net length of the stroke limiters and the shuttle piston add only a small amount of length (8-10 mm) to the damper to achieve a gap "g" of about 5 mm of free stroke. Existing technologies add much more length (40 mm) to achieve about 8 mm of free stroke, decreasing the effective stroke of the damper in direct proportion to this increase in length.

It will become apparent to those skilled in the art that various modifications to the preferred embodiment of the invention as described herein can be made without departing from the spirit or scope of the invention as defined by the appended claims.

The invention claimed is:

1. A free space damper comprising:
a cylinder having a rod extending therefrom, said cylinder and rod coupled between a fixed member and an object to be damped;
a spool-shaped piston slideably mounted to said rod and including radially extending slots for receiving a pair of motion limiters;
a pair of spaced-apart disk-shaped motion limiters spanning opposite sides of said piston in axially spaced relationship thereto, said motion limiters coupled to said slots of said piston in fixed offset relationship to one another; and
a friction element coupled to said piston for engaging the inner wall of said cylinder for providing friction damping when engaged by one of said limiters.

2. The damper as defined in claim 1 wherein said friction element comprises a closed-cell polymeric foam.

3. A free space damper comprising:
a cylinder having a rod extending therefrom, said cylinder and rod coupled between a fixed member and an object to be damped;
a spool-shaped piston slideably mounted to said rod;
a pair of spaced-apart disk-shaped motion limiters spanning opposite sides of said piston in spaced relationship thereto; and
a closed-cell polymeric foam friction element coupled to said piston for engaging the inner wall of said cylinder for providing friction damping when engaged by one of said limiters, wherein said limiters include axially extending tabs which selectively engage said foam as said piston is engaged by said limiters to cushion the contact between said piston and limiters.

4. A free space damper comprising:
a cylinder having a rod extending therefrom, said cylinder and rod coupled between a fixed member and an object to be damped;
a spool-shaped piston slideably mounted to said rod;
a pair of spaced-apart disk-shaped motion limiters spanning opposite sides of said piston in spaced relationship thereto; and
a friction element coupled to said piston for engaging the inner wall of said cylinder for providing friction damping when engaged by one of said limiters, wherein said limiters are integrally molded of a polymeric material and include integral axially extending spring fingers for engaging said piston as said limiters contact said piston to cushion the engagement of said piston with said limiters.

5. The damper as defined in claim 1 wherein said limiters are disk-shaped having a central axle extending through said spool-shaped piston, wherein said axles have a length such that said axles of said limiters contact one another for positioning said disk-shaped limiters in spaced relationship to the ends of said spool-shaped piston.

6. A free space damper comprising:
a cylinder having a connecting rod extending therefrom;
a spool-shaped piston positioned within said cylinder and slideably mounted to said rod, said piston including a central aperture for receiving said rod and slots extending radially outwardly from said central aperture;
a compression spring surrounding said rod and urging said piston to an end of said rod;
a friction element coupled to said piston for engaging the inner wall of said cylinder for providing friction damping; and
a pair of spaced-apart motion limiters positioned in axially movable relationship on opposite sides of said piston to move said piston when said rod moves a predetermined distance, wherein said motion limiters include flanges which extend within said slots of said piston to position said limiters in a fixed angular relationship to one another.

7. The damper as defined in claim 6 and further including a stop at said end of said rod and wherein said compression spring extends between one end of said cylinder and one of said motion limiters.

8. The damper as defined in claim 7 wherein said friction element comprises a closed-cell polymeric foam.

9. A free space damper comprising:
a cylinder having a connecting rod extending therefrom;
a spool-shaped piston positioned within said cylinder and slideably mounted to said rod;
a compression spring surrounding said rod and urging said piston to an end of said rod;
a closed-cell polymeric foam friction element coupled to said piston for engaging the inner wall of said cylinder for providing friction damping;
a pair of spaced-apart motion limiters positioned in axially movable relationship on opposite sides of said piston to move said piston when said rod moves a predetermined distance, and further including a stop at said end of said rod and wherein said compression spring extends between one end of said cylinder and one of said motion limiters; and
wherein said motion limiters are disk-shaped and include axially extending tabs which selectively engage said foam as said piston is engaged by said limiters to cushion the contact between said piston and limiters.

10. The damper as defined in claim 9 wherein said tabs of one motion limiter are staggered in angular relationship to said tabs of the other motion limiter.

11. The damper as defined in claim 10 wherein said spool-shaped piston includes slots for receiving said tabs of said motion limiters.

12. A free space damper comprising:
a cylinder having a connecting rod extending therefrom;
a spool-shaped piston positioned within said cylinder and slideably mounted to said rod;
a compression spring surrounding said rod and urging said piston to an end of said rod;
a friction element coupled to said piston for engaging the inner wall of said cylinder for providing friction damping; and
a pair of spaced-apart motion limiters positioned in axially movable relationship on opposite sides of said piston to move said piston when said rod moves a predetermined distance, wherein said limiters are integrally molded of a polymeric material and include integral axially extending spring fingers for engaging said piston as said limiters contact with said piston to cushion the engagement of said piston with said limiters.

13. A free space damper comprising:
a cylinder having a connecting rod extending therefrom;
a spool-shaped piston positioned within said cylinder and slideably mounted to said rod;
a compression spring surrounding said rod and urging said piston to an end of said rod;
a friction element coupled to said piston for engaging the inner wall of said cylinder for providing friction damping; and
a pair of spaced-apart motion limiters positioned in axially movable relationship on opposite sides of said piston to move said piston when said rod moves a predetermined distance, wherein said limiters are disk-shaped having a central axle extending through said spool-shaped piston, wherein said axles have a length such that said axles of said limiters contact one another for positioning said disk-shaped limiters in spaced relationship to the ends of said spool-shaped piston.

14. A free space damper spool assembly comprising:
a spool-shaped piston having disk-shaped opposite ends and a cylindrical body with radially extending slots;
a friction element coupled to said cylindrical body between said opposite ends, said friction element shaped for engaging the inner wall of a damping cylinder for selectively providing friction damping when said assembly is installed in a damper;
a pair of spaced-apart disk-shaped motion limiters movably coupled to said cylindrical body of said piston at opposite ends of said piston and movable a predetermined distance before contacting said ends of said piston, said limiters including flanges extending within said slots of said piston; and
said motion limiters including an element that engages one of said ends of said piston and said friction element to provide initial cushioning between said motion limiters and said piston.

15. A free space damper spool assembly comprising:
a spool-shaped piston having disk-shaped opposite ends and a cylindrical body;
a friction element coupled to said cylindrical body between said opposite ends, said friction element shaped for engaging the inner wall of a damping cylinder for selectively providing friction damping when said assembly is installed in a damper;
a pair of spaced-apart disk-shaped motion limiters movably coupled to said cylindrical body of said piston at opposite ends of said piston and movable a predetermined distance before contacting said ends of said piston, wherein said cylindrical body includes a longitudinally extending central aperture with at least one radially extending slot extending outwardly therefrom and wherein said motion limiters include an axle extending within said aperture of said cylindrical body and a flange extending within said radially extending slot for indexing said motion limiters in angular relationship to said piston; and
said motion limiters including an element that engages one of said ends of said piston and said friction element to provide initial cushioning between said motion limiters and said piston.

16. The assembly as defined in claim 15 wherein said limiters include axially extending tabs which selectively engage said friction element as said piston is engaged by said limiters to cushion the contact between said piston and limiters.

17. The assembly as defined in claim 16 wherein said limiters are integrally molded of a polymeric material and include integral axially extending spring fingers for engaging said ends of said piston as said limiters come into contact with said piston to cushion the engagement of said piston with said limiters.

18. A free space damper spool assembly comprising:
a spool-shaped piston having disk-shaped opposite ends and a cylindrical body;
a friction element coupled to said cylindrical body between said opposite ends, said friction element shaped for engaging the inner wall of a damping cylinder for selectively providing friction damping when said assembly is installed in a damper;
a pair of spaced-apart disk-shaped motion limiters movably coupled to said cylindrical body of said piston at opposite ends of said piston and movable a predetermined distance before contacting said ends of said piston, wherein said limiters are disk-shaped having a central axle extending through said spool-shaped piston, wherein said axles have a length such that said axles of said limiters contact one another for positioning said disk-shaped limiters in spaced relationship to said ends of said spool-shaped piston; and
said motion limiters including an element that engages one of said ends of said piston and said friction element to provide initial cushioning between said motion limiters and said piston.

19. The assembly as defined in claim 16 wherein said limiters are spaced from said ends of said piston a distance of about 5 mm.

20. The assembly as defined in claim 16 wherein said friction element comprises a polyurethane foam surrounding said cylindrical body of said piston.

* * * * *